(12) United States Patent  
Ratilla

(10) Patent No.: US 10,068,453 B2  
(45) Date of Patent: Sep. 4, 2018

(54) ANALOG OUTPUT DIAGNOSIS TOOL

(71) Applicant: YOKOGAWA ELECTRIC CORPORATION, Tokyo (JP)

(72) Inventor: Jasper Bryan Sale Ratilla, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 24 days.

(21) Appl. No.: 15/257,278

(22) Filed: Sep. 6, 2016

(65) Prior Publication Data

US 2018/0068550 A1 Mar. 8, 2018

(51) Int. Cl.
G08B 21/00 (2006.01)
G08B 21/18 (2006.01)
G06F 17/11 (2006.01)
G01D 18/00 (2006.01)

(52) U.S. Cl.
CPC .......... G08B 21/182 (2013.01); G01D 18/00 (2013.01); G06F 17/11 (2013.01)

(58) Field of Classification Search
CPC ...... G05B 2219/25428; G05B 19/0425; G05B 2219/33331; G05B 23/0235; G05B 23/0267
See application file for complete search history.

(56) References Cited

U.S. PATENT DOCUMENTS 6,294,991 B1 * 9/2001 Allen .................. H04L 41/0654
340/506
2002/0170220 A1 * 11/2002 Recce ..................... B60R 25/04
42/70.08

2008/0300698 A1 12/2008 Havekost et al.
2012/0278042 A1 11/2012 Matzen
2016/0330225 A1 * 11/2016 Kroyzer ................ G06F 21/552

FOREIGN PATENT DOCUMENTS

DE 19839047 A1 1/2000

OTHER PUBLICATIONS

Communication dated Sep. 18, 2017 issued by the European Patent Office in counterpart application No. 17150358.4.

* cited by examiner

*Primary Examiner* — Omeed Alizada
(74) *Attorney, Agent, or Firm* — Sughrue Mion, PLLC

(57) ABSTRACT

A system, method, and an apparatus related to a diagnostic tool to recognize abnormalities in the readings from the transmitter device. The diagnostic tool may diagnose the health of the transmitter device through review of an analog output and comparing it to a digital value. This comparison may be done periodically. The system includes a device for detecting field device operational anomalies of a field device in an industrial process. The system includes a storage medium operable to store program code and a processor operable to read the program code and operate as instructed by the program code. The program code includes acquiring an analog process variable (PV) value from the field device, acquiring a digital process variable (PV) value from the field device, calculating a difference value between the analog PV value and the digital PV value, comparing the difference value to a first threshold alert value, and issuing an alert to a user if the difference value exceeds the first threshold alert value.

11 Claims, 16 Drawing Sheets

| Time | Analog PV 61 | Digital PV | Current Diff. PV(mA) 64 | Average Diff. PV(mA) 65 |
|---|---|---|---|---|
| | | 62 | 63 | |
| 12/12/2014 6:32:32 PM | 0 | 0.1 | -0.1 | 0 |
| 12/12/2014 6:42:32 PM | 0.01 | 0.1 | -0.09 | |
| 12/12/2014 6:52:32 PM | 0.02 | 0.1 | -0.08 | |
| 12/12/2014 7:02:32 PM | 0.03 | 0.1 | -0.07 | 0.03 |
| 12/12/2014 7:12:32 PM | 0.04 | 0.1 | -0.06 | |
| 12/12/2014 7:22:32 PM | 0.05 | 0.1 | -0.05 | |
| 12/12/2014 7:32:32 PM | 0.06 | 0.1 | -0.04 | 0.06 |
| 12/12/2014 7:42:32 PM | 0.07 | 0.1 | -0.03 | |
| 12/12/2014 7:52:32 PM | 0.08 | 0.1 | -0.02 | |
| 12/12/2014 8:02:32 PM | 0.09 | 0.1 | -0.01 | 0.09 |
| 12/12/2014 8:12:32 PM | 0.10 | 0.1 | 0.00 | |
| 12/12/2014 8:22:32 PM | 0.11 | 0.1 | 0.01 | |
| 12/12/2014 8:32:32 PM | 0.12 | 0.1 | 0.02 | 0.12 |
| 12/12/2014 8:42:32 PM | 0.13 | 0.1 | 0.03 | |
| 12/12/2014 8:52:32 PM | 0.14 | 0.1 | 0.04 | |
| 12/12/2014 9:02:32 PM | 0.15 | 0.1 | 0.05 | 0.15 |
| 12/12/2014 9:12:32 PM | 0.16 | 0.1 | 0.06 | |

FIG. 6

| | | | |
|---|---|---|---|
| 701 — STATUS | NORMAL | 707 — 0 | ANALOG PV AVERAGE | 711 — 0 | DIGITAL PV AVERAGE |
| 702 — CURRENT ANALOG PV | 0 | 708 — 0 | ANALOG PV MAX | 712 — 0 | DIGITAL PV MAX |
| 703 — CURRENT DIGITAL PV | 0 | 709 — 0 | ANALOG PV MIN | 713 — 0 | DIGITAL PV MIN |
| 704 — CURRENT DEVIATION OF A/D PV | 0 | 710 — 0 | ANALOG PV STD DEV | 714 — 0 | DIGITAL PV STD DEV |
| 705 — CURRENT AVERAGE DEV. OF A/D PV | 0 | | | | |
| 706 — CAPSULE TEMPERATURE | 0 | | | | |

Chart 1: Accumulated Judgment

<Accumulated n, m times, Criteria: 3 times>

| # | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Result | OK | NG | OK | NG | NG | OK | NG | NG | NG | NG | OK | OK | OK | NG | NG |
| Count | 0 | 1 | 0 | 1 | 2 | 1 | 2 | 3 | 3 | 3 | 2 | 1 | 0 | 1 | 0 |
| Judge | N | N | N | N | N | N | N | F | F | F | F | F | N | N | N |

Chart 2: Status Decision based on Accumulated Judgement

Example:
Assume Error Level = 0.5 and Warning Level = 0.1, and De-bounce count = 3.

| # | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Result (Average PV Diff.) | 0.002 | 0.010 | 0.060 | 0.087 | 0.207 | 0.306 | 0.365 | 0.552 | 0.774 | 0.788 | 0.851 | 0.868 | 0.34 | 0.055 | 0.035 |
| Warning Count | 0 | 0 | 0 | 0 | 1 | 2 | 3 | 3 | 3 | 3 | 3 | 3 | 3 | 2 | 1 |
| Error Count | 0 | 0 | 0 | 0 | 0 | 0 | 0 | 1 | 2 | 3 | 3 | 3 | 2 | 1 | 0 |
| Judge (Device Status) | N | N | N | N | N | N | W | W | W | E | E | E | E | E | W |

Chart 3: Continuous Judgment

<Continuous n, m times, Criteria: 3 times>

| # | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Result | OK | NG | OK | NG | NG | OK | NG | NG | NG | NG | OK | NG | OK | OK | NG |
| Count | 0 | 1 | 0 | 1 | 2 | 0 | 1 | 2 | 3 | 3 | 0 | 1 | 0 | 0 | 1 |
| Judge | P | P | P | P | P | P | P | P | F | F | P | P | P | P | P |

Chart 4: Status Decision based on Continuous Judgement

Example:
Assume Error Level = 0.5 and Warning Level = 0.1, and De-bounce count = 3.

| # | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Result (Average PV Diff.) | 0.002 | 0.010 | 0.060 | 0.087 | 0.207 | 0.306 | 0.365 | 0.552 | 0.774 | 0.788 | 0.851 | 0.868 | 0.34 | 0.055 | 0.035 |
| Warning Count | 0 | 0 | 0 | 0 | 1 | 2 | 3 | 3 | 3 | 3 | 3 | 3 | 3 | 0 | 0 |
| Error Count | 0 | 0 | 0 | 0 | 0 | 0 | 0 | 1 | 2 | 3 | 3 | 3 | 0 | 0 | 0 |
| Judge (Device Status) | N | N | N | N | N | N | W | W | W | E | E | E | W | N | N |

ANALOG OUTPUT DIAGNOSIS TOOL

FIELD OF THE INVENTION

Exemplary embodiments relate to field device systems and methods, the monitoring of industrial automation processes with field devices, and the automatic diversion of a flow path of an industrial process through an alternative field device.

BACKGROUND

In the related art concerning industrial plant environments, is important to maintain the operability of field devices involved in plant processes. To control plant processes, sensors are used to transmit readings for monitoring the process. In harsh environments, the field devices or sensors will degrade due to the time they are exposed to the environment. For example, in hot and high humidity environments, a transmitter device's parts or circuitry will rapidly degrade due to corrosion. Also, equipment will degrade simply due to extended periods of deployment in the field. As time goes on, abnormalities in the readings from the transmitter device will appear.

Generally, as a plant or process develops, the number of transmitter devices needed to monitor the process and collect data will grow dramatically. Especially where there is a large number of transmitter devices, it is important to ensure the operability of all transmitter devices over extended periods of normal operation. If abnormalities are unexpectedly developed, detected and reported, the process may have to be shut down for evaluation and repair. This would result in unplanned downtime and financial loss for a customer.

Even with a low percentage breakdown rate, the vast number of field devices deployed in the field means that there are still thousands of field devices or transmitter devices that may breakdown. For example, if a high humidity region of the world has 50,000 deployed field devices, a 1% failure rate per year raises the possibility that over 500 transmitter devices will fail per year. Additionally, in any given industrial process, there may be a large number of field devices, such that a single engineer or manager is responsible for the oversight of a large number of field devices. A number of field device failures at one time can strain the capability of staff to resolve problems in an efficient and effective manner.

SUMMARY

One or more embodiments of the present application is directed towards the automatic diversion of a flow path of an industrial process through an alternative field device using a diagnostic tool to recognize abnormalities in the readings from the transmitter device. The ability for diagnostic tool to recognize abnormalities in the readings from the field devices provides a maintenance engineer with information that would otherwise be unavailable because of the size and complexity of industrial processes that utilize a large number of field devices. The ability to automatically divert a flow path of an industrial process through an alternative field device based on the output of the diagnostic tool leads to desired system improvement. The diagnostic tool may diagnose the health of the transmitter device through review of an analog output and comparing it to a digital value. This comparison may be done periodically. By performing the diagnostic, prediction can be done to diagnose the health or the degree of degradation of the field device. This can allow for early replacement of field devices that are beginning to fail or operate outside of normal ranges. Predictive diagnostics provide early detection and prevention of the transmitter problems or issues to avoid plant operation shutdown that may lead to economic losses or the loss of the client operating the plant operation.

One or more embodiments of the disclosure relate to a method for the automatic diversion of a flow path of an industrial process through an alternative field device based on an efficient detecting of field device operational anomalies of a field device in an industrial process. The method includes acquiring an analog process variable (PV) value from the field device, acquiring a digital process variable (PV) value from the field device, calculating a difference value between the analog PV value and the digital PV value, comparing the difference value to a first threshold alert value, and issuing an alert to a user if the difference value exceeds the first threshold alert value.

Also, the analog PV value and the digital PV value may be iteratively reacquired at a scheduled interval from the field device, wherein the difference value is iteratively recalculated for the scheduled intervals and the alert is only issued after a set number of successive iterations where the difference value exceeds the first threshold alert value.

Further, the method may further comprise counting a number of alerts, wherein the number of alerts count increases for successive iterations where the difference value exceeds the first threshold alert value.

Additionally, the method may include wherein the number of alerts count resets to zero after the difference value falls below the first threshold alert value.

In addition, the method may include wherein the number of alerts count incrementally increases or decreases based on comparing the difference value to the first threshold alert value.

Also, the method may further include automatically diverting a flow path of the industrial process through another field device when the difference value exceeds the first threshold alert value.

One or more embodiments of the disclosure relate to a system including at least one device for detecting field device operational anomalies of a field device in an industrial process. The system includes at least one non-transitory computer readable storage medium operable to store program code and at least one processor operable to read said program code and operate as instructed by the program code. The program code includes acquiring an analog process variable (PV) value from the field device, acquiring a digital process variable (PV) value from the field device, calculating a difference value between the analog PV value and the digital PV value, comparing the difference value to a first threshold alert value, and issuing an alert to a user if the difference value exceeds the first threshold alert value.

Additionally, the system may include wherein the analog PV value and the digital PV value are iteratively reacquired at a scheduled interval from the field device, wherein the difference value is iteratively recalculated for the scheduled intervals, and wherein the alert is only issued after a set number of successive iterations where the difference value exceeds the first threshold alert value.

Also, the program code may further include counting a number of alerts, wherein the number of alerts count increases for successive iterations where the difference value exceeds the first threshold alert value.

In addition, the system may include wherein the number of alerts count resets to zero after the difference value falls below the first threshold alert value.

Further, the system may further include wherein the number of alerts count incrementally increases or decreases based on comparing the difference value to the first threshold alert value.

In addition, the program code may further include automatically diverting a flow path of the industrial process through another field device when the difference value exceeds the first threshold alert value.

BRIEF DESCRIPTION OF THE DRAWINGS

FIG. 6 illustrates a table of current and average difference PV values as a potential output from the diagnostic tool.

FIG. 7 illustrates a table of diagnostic calculations that are potential outputs from the diagnostic tool.

FIG. 15 illustrates scenarios of diagnostic judgments with respect to warning and error levels based on the average difference PV value.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

One or more embodiments of the present application are directed towards an analog output diagnosis tool (AODT). The AODT provides predicted and precognitive diagnostic tools that detect analog—digital mismatching for transmitter output integrity. It checks the behavior of the analog output of a field device and compares it with an additional value of the field device. When the analog-digital mismatch is detected, physical hardware of the field device may have degraded over time.

Figure 1:
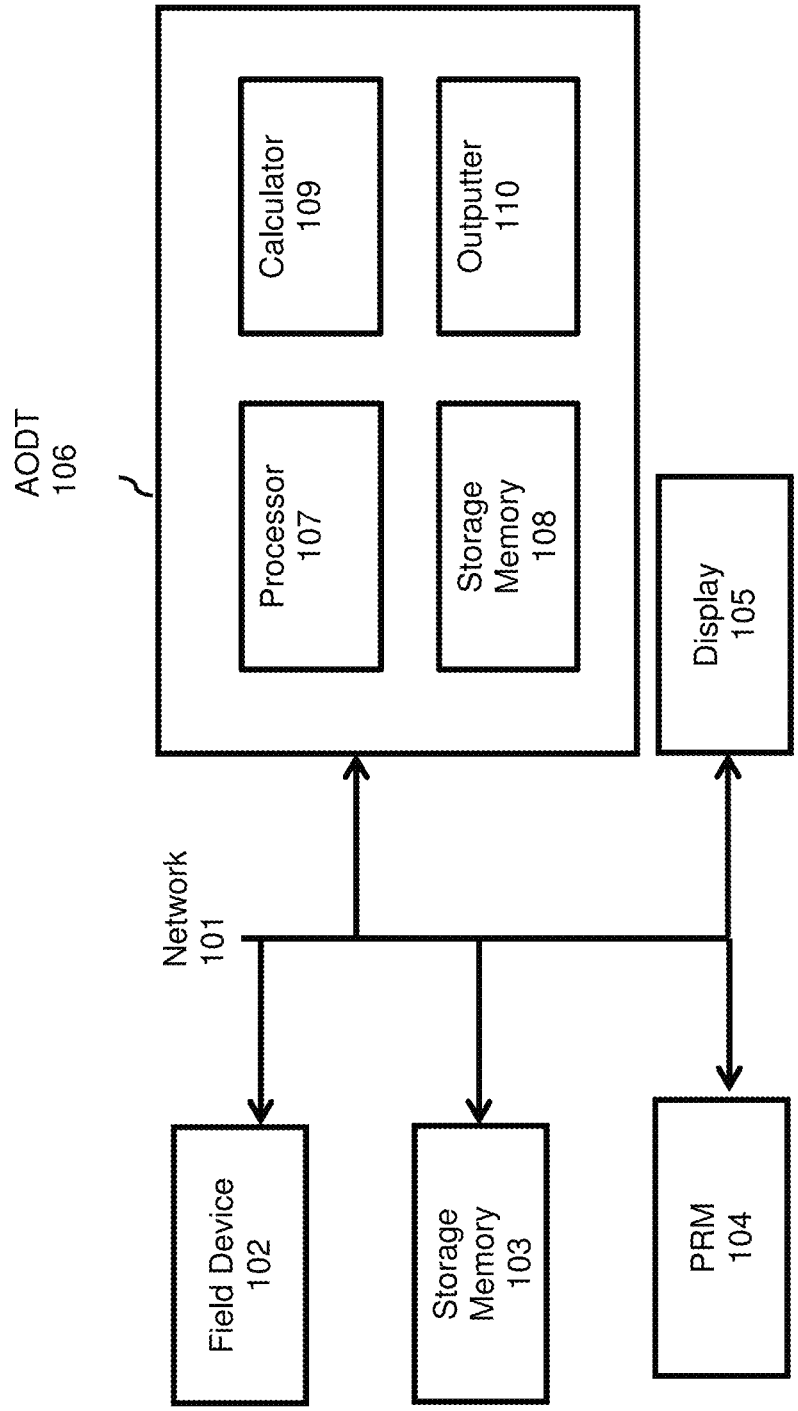
FIG. 1 illustrates an exemplary system architecture for an automatic diversion of a flow path of an industrial process through an alternative field device based on the output of an analog output diagnostic tool.

FIG. 1 illustrates an exemplary system architecture having an analog output diagnostic tool (AODT) (106). The system may include a field device (102), a storage memory (103), plant asset manager (PAM) (104), a display (105), and an AODT (106). These components may be connected through a network (101). In some embodiments, combinations of these components may be integrated together. The AODT (106) may include a processor (107), a storage memory (108), a calculator (109), and an outputter (110). The calculator (109) can be configured to retrieve data samples from the field device and calculate diagnostic calculations from the data samples. The outputter (110) can be configured to output information either for displaying or for storage into memory. The output information may include the data samples, diagnostic calculations, and graphical plots or tables of the data samples or diagnostic calculations.

Figure 16:
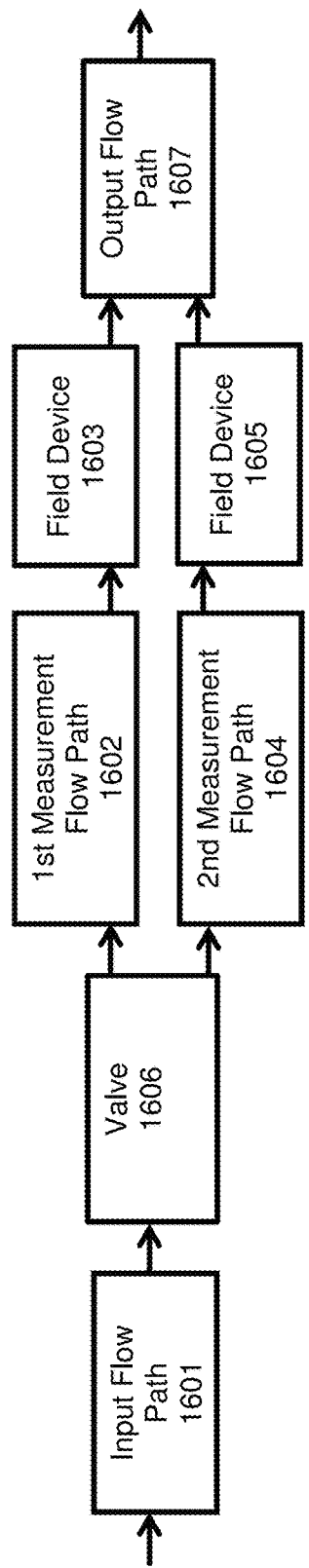
FIG. 16 illustrates an exemplary scenario of automatic diversion of a flow path of a process.

FIG. 16 shows an exemplary embodiment showing an automatic diversion of a flow path based on the AODT diagnosis. The process may have an input flow path 1601 and be originally routed through a first measurement flow path 1602 having a first field device or sensor 1603. In the event that the AODT diagnoses that the first field device 1603 has failed or is predicted to fail, the process may be rerouted through a second measurement flow path 1604 having a second field device 1605. This rerouting may be achieved through a valve or switch 1606. The rerouting may flow through an entirely different output flow path or may be routed back to a common output flow path 1607.

Data Acquisition

Figure 2:
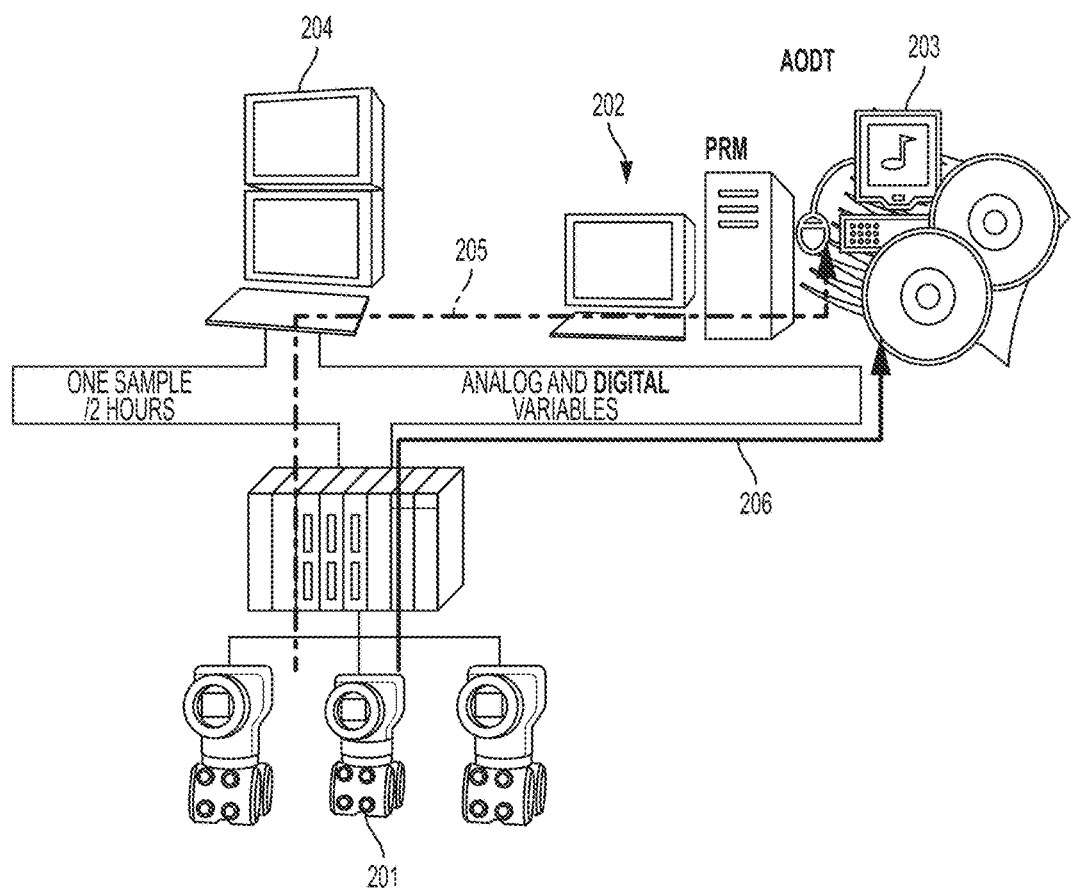
FIG. 2 illustrates an exemplary system architecture using an automatic diversion of a flow path of an industrial process through an alternative field device based on the output of an analog output diagnostic tool.

FIG. 2 shows an exemplary system layout of field devices (201), the AODT (203), a day plant asset management product (PAM) or plant asset optimization product (202), and a console (204). These components may be connected to single network, or they may be connected across a grouping of networks. For example, the field devices may be connected on a network to the PAM (202) and/or and the AODT (203), while the console (204) may be connected to the PAM (202) and/or the AODT (203) on a second network. The field devices can send the necessary information for determination of both an analog and digital process value (PV).

In order to diagnose whether the field device is operating properly or has issues, the AODT compares an analog PV value from the field device with a digital PV value from the field device. Analog PV means a 4-20 mA signal after analog to digital conversion. Digital PV can be provided in one of two ways. This value may be obtained by HART command 3 #0-3 or calculated from measurement data. Table 1 illustrates an embodiment where the analog PV can be obtained from an input/output module (IOM) of a field device or field device control station (FCS). Separately, the digital PV can be obtained from a reading from the field device.

TABLE 1

Digital PV and Analog PV

| Reading from Device | Reading from IOM |
|---|---|
| Digital PV | Analog PV |

Figure 3:
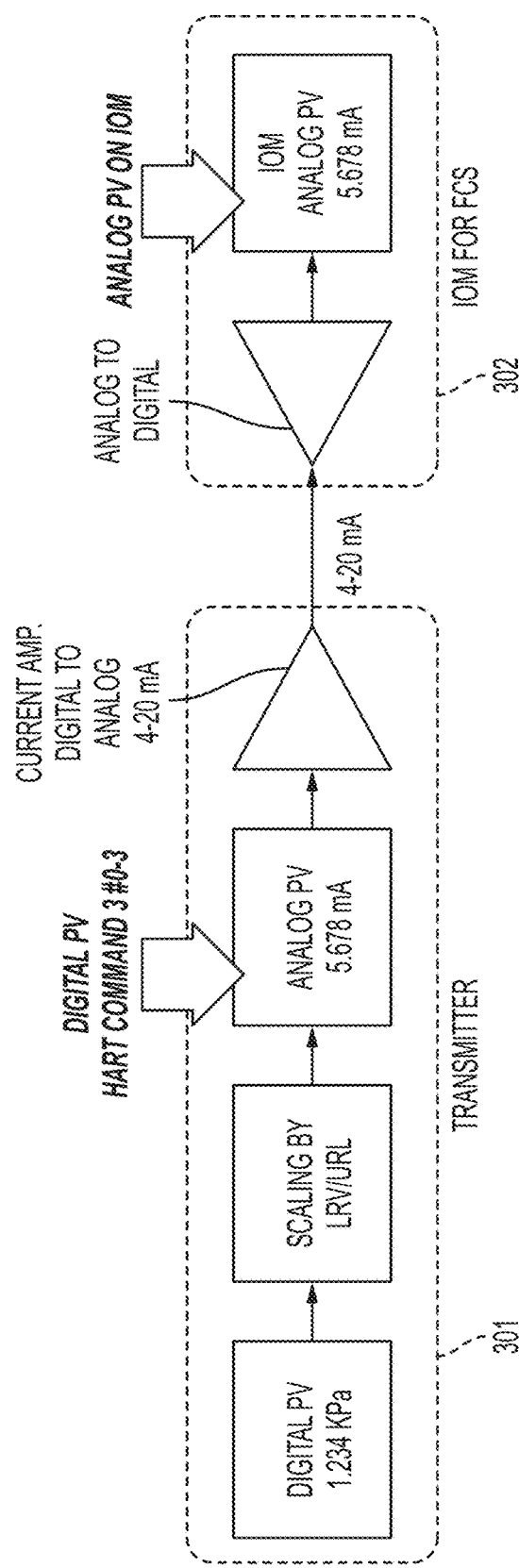
FIG. 3 illustrates elements for retrieving PV values by analog and digital components.

FIG. 3 illustrates an embodiment of obtaining the analog PV and the digital PV. With the transmitter (301) of the field device, the digital PV value may be obtained by HART command 3 #0-3 or calculated from measurement data. For the analog PV, the value can be obtained from an input/output module (IOM) (302) of a field device or field device control station (FCS).

Figure 8:
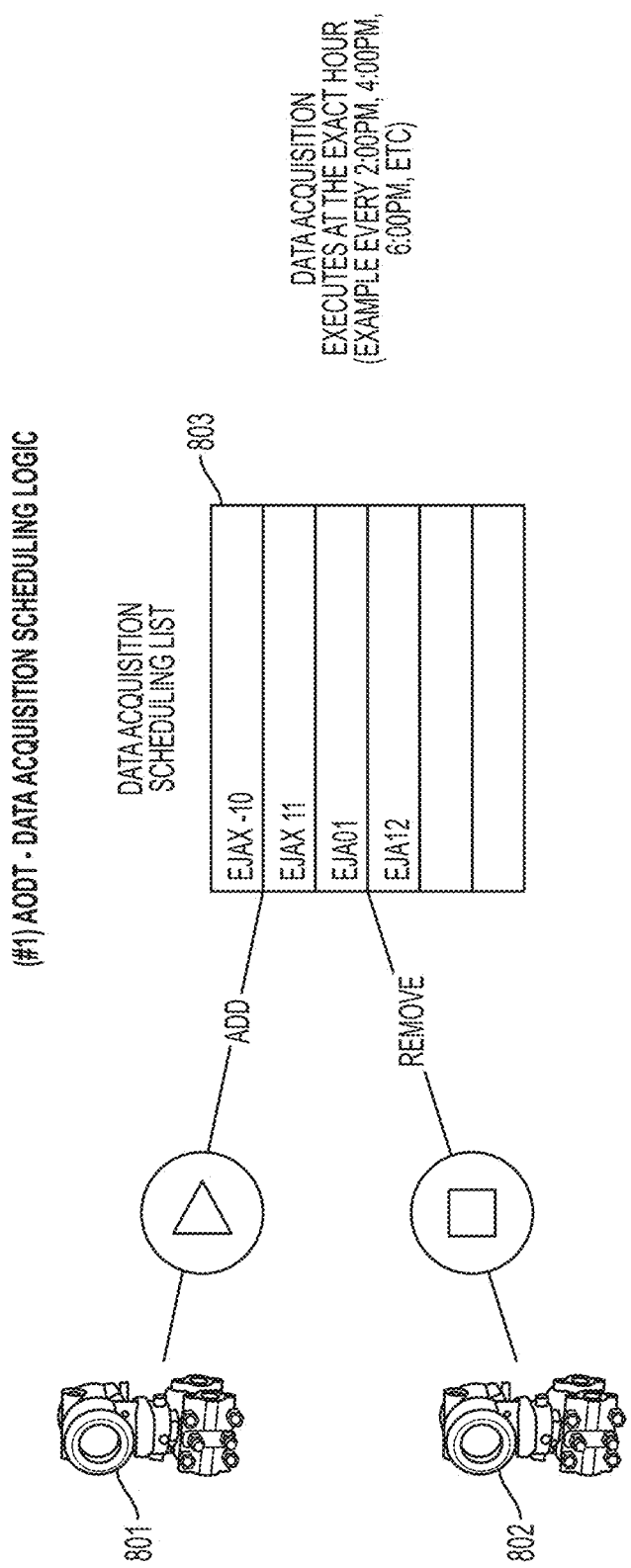
FIG. 8 illustrates an exemplary embodiment of a data acquisition scheduling list for field devices.

With the AODT, there is configured to be a list of devices scheduled for data acquisition of raw data that can be used for diagnostics calculations. This list of devices scheduled for data acquisition was called data acquisition scheduling. FIG. 8 illustrates the addition of devices to a data acquisition scheduling list. The AODT can have a user interface that allows for the addition of a field device (801) to the data acquisition scheduling list (803). Additionally the user interface would provide the ability to remove a field device (802) from the data acquisition scheduling list (803).

As part of the data acquisition scheduling the AODT acquires data samples for data acquisition points, wherein the data acquisition point is retrieved at a set sampling interval. Table 2 shows the parameters that may be sampled for each data acquisition point. The parameters, as shown in Table 2, include time, digital PV, analog PV, current difference PV, and average difference PV.

TABLE 2

Data Acquisition Point Parameters

| Data | Unit | Description |
|---|---|---|
| Time | Date Time | This is timestamp of the data acquisition. This is generated by the tool. |
| Digital PV | mA | This is acquired Digital PV. (Retrieve using Command 3) |
| Analog PV | mA | This is acquired Analog PV. (Retrieve using Fast Device Patrol Ex.) |
| Current Diff. PV | mA | This is difference between Analog PV minus Digital PV. |
| Average Diff. PV | mA | This is average of Current Diff. PV based on sampling count. |

Figure 4:
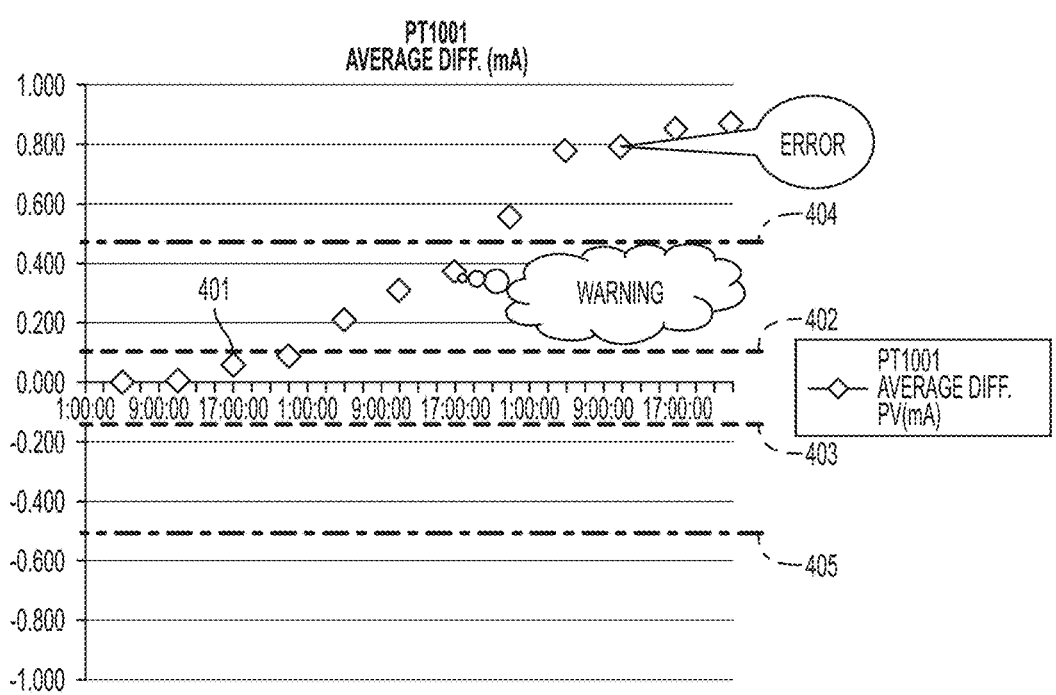
FIG. 4 illustrates a chart of average difference PV values with respect to warning and error ranges.

Table 3 is an exemplary display of data values from data acquisition points in a tabular format. FIG. 4 illustrates a graphical representation of the warning or error based on average difference between the analog PV value and the digital PV value. The data points of the difference (401) can be charted and graphically represented. When the difference exceeds in an upper positive threshold (402) or lower negative threshold (403), it triggers a warning alert. Once the difference then further exceeds an upper positive threshold (404) or a lower negative threshold (405), it triggers an error alert.

TABLE 3

| Time | Analog PV | Digital PV | PT1001 Current(mA) | PT1001 Average Diff. PV(mA) |
|---|---|---|---|---|
| 1:00:00 | 12.541 | 12.542 | −0.001 | |
| 3:00:00 | 12.554 | 12.552 | 0.002 | |
| 5:00:00 | 12.554 | 12.55 | 0.004 | 0.002 |
| 7:00:00 | 12.549 | 12.544 | 0.005 | |
| 9:00:00 | 12.543 | 12.529 | 0.014 | |
| 11:00:00 | 12.563 | 12.552 | 0.011 | 0.010 |
| 13:00:00 | 12.554 | 12.544 | 0.01 | |
| 15:00:00 | 12.538 | 12.533 | 0.005 | |
| 17:00:00 | 12.693 | 12.528 | 0.165 | 0.060 |
| 19:00:00 | 12.634 | 12.579 | 0.055 | |
| 21:00:00 | 12.663 | 12.533 | 0.13 | |
| 23:00:00 | 12.654 | 12.579 | 0.075 | 0.087 |
| 1:00:00 | 12.788 | 12.599 | 0.189 | |
| 3:00:00 | 12.799 | 12.561 | 0.238 | |
| 5:00:00 | 12.818 | 12.623 | 0.195 | 0.207 |
| 7:00:00 | 12.768 | 12.585 | 0.183 | |
| 9:00:00 | 12.728 | 12.447 | 0.281 | |
| 11:00:00 | 12.863 | 12.409 | 0.454 | 0.306 |
| 13:00:00 | 12.858 | 12.471 | 0.387 | |
| 15:00:00 | 12.873 | 12.433 | 0.44 | |
| 17:00:00 | 12.868 | 12.599 | 0.269 | 0.365 |
| 19:00:00 | 12.923 | 12.561 | 0.362 | |
| 21:00:00 | 13.048 | 12.523 | 0.525 | |
| 23:00:00 | 13.253 | 12.485 | 0.768 | 0.552 |
| 1:00:00 | 13.268 | 12.533 | 0.735 | |
| 3:00:00 | 13.283 | 12.528 | 0.755 | |
| 5:00:00 | 13.298 | 12.467 | 0.831 | 0.774 |
| 7:00:00 | 13.343 | 12.599 | 0.744 | |
| 9:00:00 | 13.348 | 12.561 | 0.787 | |
| 11:00:00 | 13.353 | 12.523 | 0.83 | 0.787 |
| 13:00:00 | 13.358 | 12.485 | 0.873 | |
| 15:00:00 | 13.373 | 12.533 | 0.84 | |
| 17:00:00 | 13.368 | 12.528 | 0.84 | 0.851 |
| 19:00:00 | 13.403 | 12.523 | 0.88 | |
| 21:00:00 | 13.418 | 12.585 | 0.833 | |
| 23:00:00 | 13.433 | 12.543 | 0.89 | 0.868 |

Data Acquisition Settings

Additionally, in order to collect the necessary number of data acquisition points, a sampling period, a sampling number, and a judgment time may be set to determine the method of data acquisition. In view of the acquired data acquisition point, it is necessary to set a diagnostic criteria. This may include a two level alert system. It may include a warning level where there is low deviation and in air level where there is a high deviation from no difference between the analog PV and the digital PV. These parameters are described in Tables 4 and 5.

TABLE 4

| Setting items | Parameter | Data | Unit |
|---|---|---|---|
| Sampling period | Sampling Interval | 2 | h |
| Sampling number | Sampling Count | 3 | points |
| Judgment times | De-bounce count | 3 | times |

TABLE 5

| Setting Items | Parameter | Data | Unit |
|---|---|---|---|
| Diag. Criteria | Error Level | 0.5 | mA |
| | Warning Level | 0.1 | mA |

Table 6 provides an exemplary explanation of the sampling period, sampling number, and judgment time. Each value may have a default value, while also having a predetermined valid operation range. The sampling period sets the polling interval for when the data acquisition point is acquired. A prototypical time for polling is intervals of 2 hours. The sampling period may be set to any value as needed, including weeks or months. However, a typical period for polling is usually between 0.01 hours and 24 hours.

TABLE 6

Acquisition Settings Parameters

| Setting items | Parameter | Default | Valid Range | Unit | Description |
|---|---|---|---|---|---|
| Sampling period | Sampling Interval | 2.0 | 1.0-24.0 | h | This is the sampling period of the data acquisition. (Valid Range is 0.01 to 24 hours for proto-type) |
| Sampling Data number | Sampling Count | 100 | 1-1000 | points | This is sample number for one diagnostics or the sample number before the Average Diff. PV is computed. |
| Judgment time | De-bounce Count | 3 | 0-100 | times | This is the judgment times before warning or error is set. |

Scheduling Behavior

Figure 9:
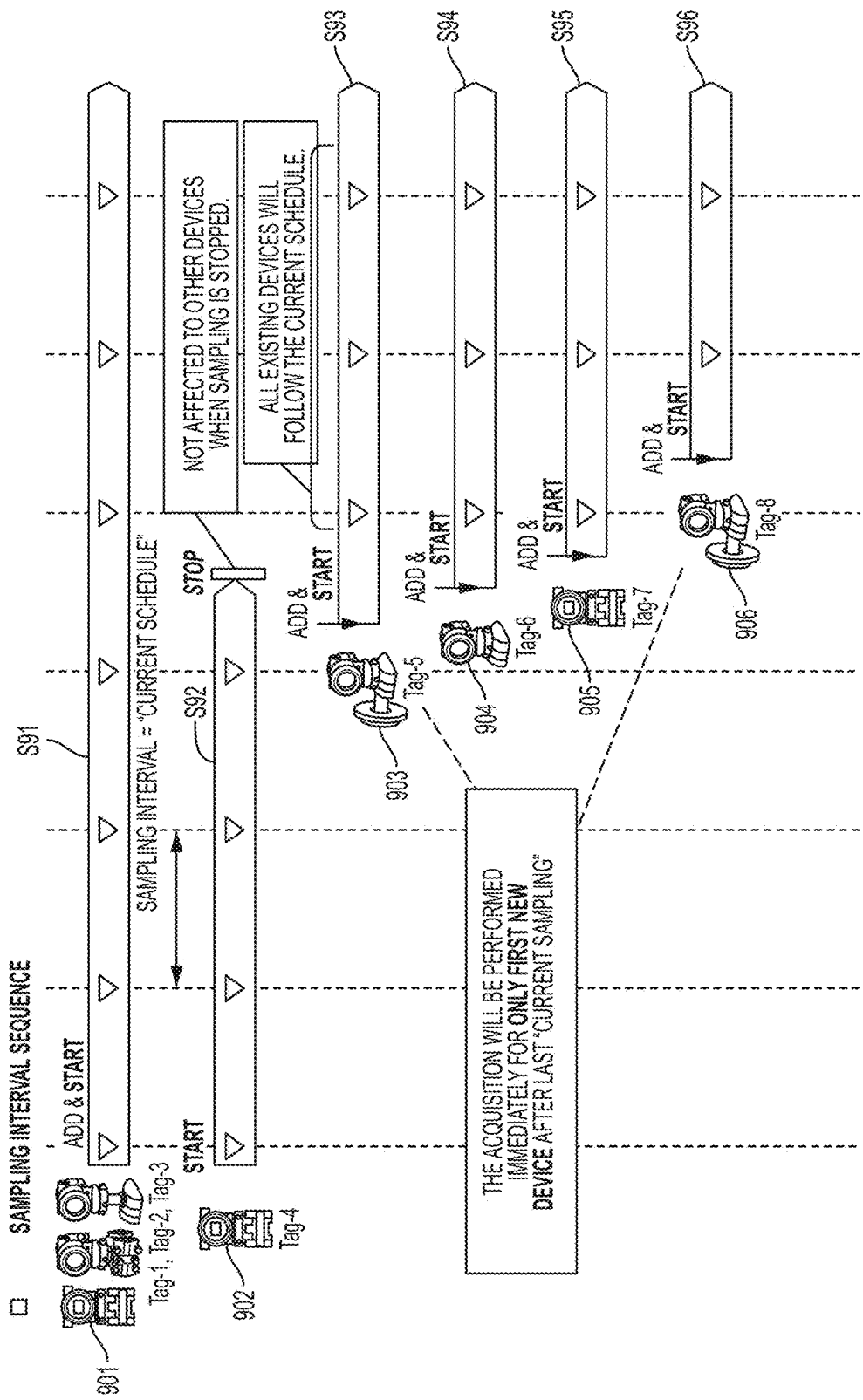
FIG. 9 illustrates a flowchart for data acquisition sampling interval sequences for field devices.

FIG. 8 illustrates a data acquisition scheduling list (803) representing the ordering of data acquisition for field devices (801, 802). The field devices (801, 802) can be added or removed from the list. The field devices are than sampled at a sampling period internal that is to be set. FIG. 9 illustrates an exemplary embodiment of how a sampling schedule may be executed across different field devices. A data acquisition scheduling list may be the originally set with field devices (901, 902) to begin with in step S91. Additional field devices may be added to the data acquisition scheduling list (903, 904, 905, 906) for sampling, as in steps S93, S94, S95, S96. Also, field devices may be removed in step S92 from the data acquisition scheduling list without affecting the sampling of the remaining field devices.

Table 7 is an exemplary explanation of the various behaviors that can be configured as part of data acquisition scheduling. Field devices can be added or removed from the data acquisition scheduling list. The sampling period, or interval, can be set based on an hour's interval. For example, in an exemplary embodiment where the sampling period is 2 hours, the sampling will occur every 2 hours exactly starting from the beginning of the day. However, in alternative embodiments, the sampling period may be based on an initial start time, such that the 2 hour interval occurs 2 hours after the initial start time instead of being based on the day.

TABLE 7

Behavior of the Data Acquisition Scheduling Behaviors

Start adds the selected device in the Data Acquisition Scheduling listed.
Stop removes the selected device in the Data Acquisition Scheduling listed.
Data Acquisition Scheduling Interval is based on the Sampling Interval.
Data Acquisition Scheduling Interval is application level setting, not per device.
Data Acquisition Scheduling triggers the acquiring or reading the Data Acquisition Point.

TABLE 7-continued

Behavior of the Data Acquisition Scheduling Behaviors

Data Acquisition executes at the exact hour based on the Scheduling Interval.
(Example: Scheduling Interval: 2 hrs, Acquisition will be on the following time of each day: 2:00am, 4:00am, 6:00am, 8:00am, 10:00am, 12:00nn, 2:00pm, 4:00pm, 6:00pm, 8:00pm, 10:00pm, 12am)

TABLE 7-continued

Behavior of the Data Acquisition Scheduling Behaviors

An immediate Acquisition will be performed once the device is added to the schedule and succeeding Acquisition will be based on the Scheduling Interval. The scheduling will not be based on the time that the device is added to the schedule but on the Scheduling Interval.
Example: Scheduling Interval: 2 hrs, Acquisition will be on the following time of each day: 2:00am, 4:00am, 6:00am, 8:00am, 10:00am, 12:00nn, 2:00pm, 4:00pm, 6:00pm, 8:00pm, 10:00pm, 12am.
Device was added into the schedule around 12:30pm, the acquisition for that device will start on 12.30pm & next is on 2:00pm onwards.

Table 8 provides an exemplary explanation of examples for data acquisition based upon a 2 hour interval sampling period. With the 2 hour interval, there are six acquisitions in the morning, three acquisitions in the afternoon, and three acquisitions in the evening. As such their 12 acquisitions per day.

TABLE 8

Example Data Acquisition Settings

| Period | Timings | Total Acquisition |
|---|---|---|
| Morning | 00:00, 02:00, 04:00, 06:00, 08:00, 10:00 | 6 |
| Afternoon | 12:00, 14:00, 16:00 | 3 |
| Evening | 18:00, 20:00, 22:00 | 3 |

To compute a first average difference PV, a total of 100 acquisitions, as set and sampling count, is to be collected. Was a 2 hour sampling period, this will require 200 hours for the computation of the first average difference PV (100 sets of sampling data*2 hours per acquisition). This is approximately 9 days. Additionally, with a judgment time or de-bounce count, of three times before a warning or error status is set, and the required hours will be 600 hours (3 sets of sampling data*200 hours per set of sampling data). This will require about 25 days.

Diagnostics Thresholds

Threshold settings will be used as diagnostics criteria settings to decide the device status. The threshold settings are device specific because the fluctuation or change in a device output are different depending on measurement range and process conditions. Table 9 shows the threshold settings parameters in an exemplary embodiment. There may be a default value for setting, while also providing an acceptable range for adjustment of the value of the error and warning levels.

TABLE 9

Threshold Settings Parameters

| Items | Parameter | Default | Valid Range | Unit | Description |
|---|---|---|---|---|---|
| Criteria | Error Level | 0.500 | 0.000-1.600 | mA | Analog-digital Deviation(+−) Failure |
| | Warning Level | 0.100 | 0.000-1.600 | mA | Analog-Digital Deviation(+−) Warning |

Figure 10:
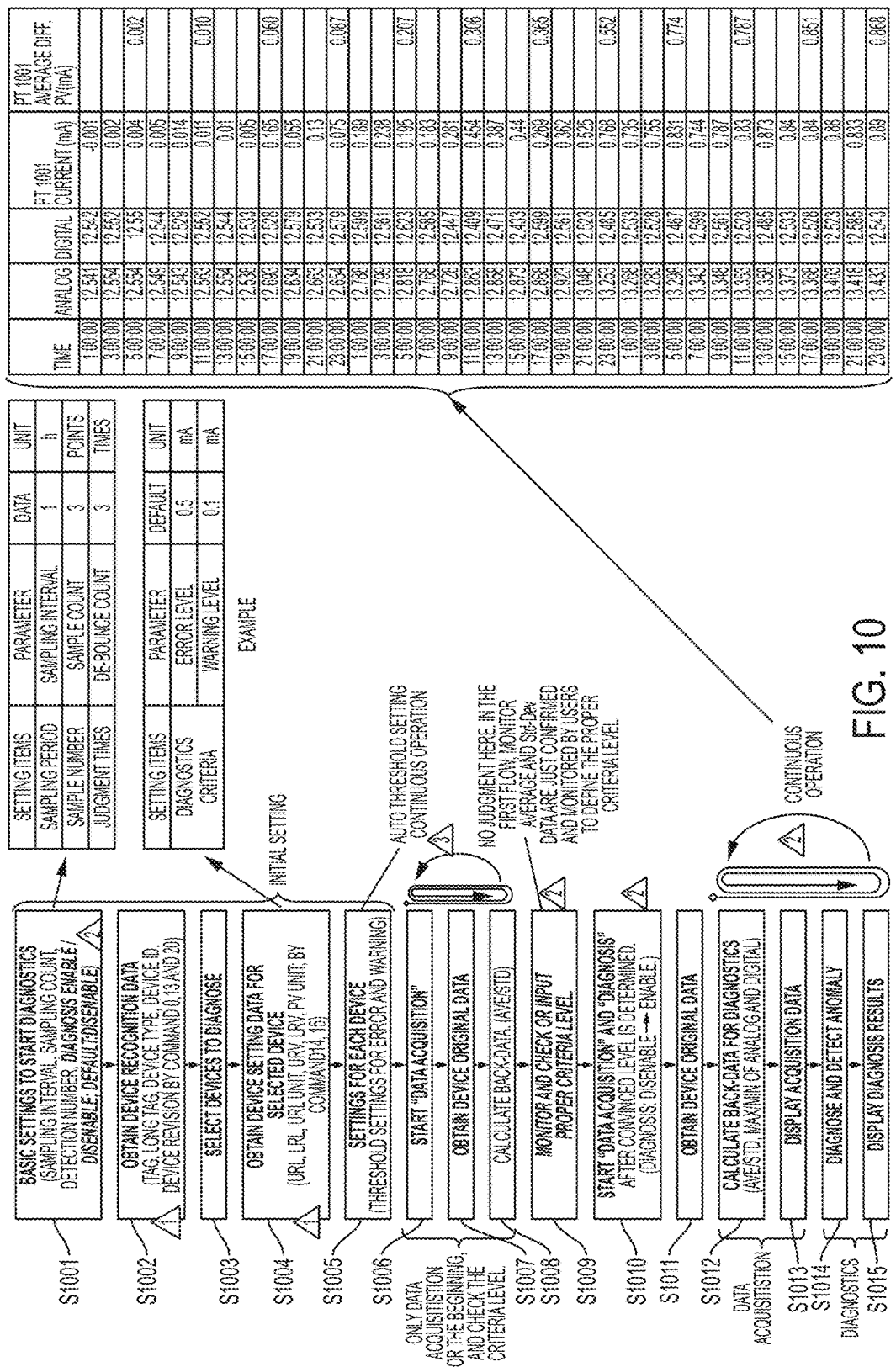
FIG. 10 illustrates a flowchart of an exemplary embodiment for setting diagnostic thresholds and configuration for diagnostic data sampling and data calculation.

FIG. 10 illustrates an exemplary method or process for setting diagnostic thresholds and configuration for diagnostic data sampling and data calculation. These steps can be set manually, automatically, or through a default configuration in order to fit the needs of a particular application. In step S1001, basic settings to begin diagnostics can be set. These settings include the parameters for data sampling, such as sampling period, sampling number, and judgment times. In step S1002, information from the field device can be obtained by obtaining device recognition data. In step S1003, a selection of the desired devices for data sampling can be made. This can be a data acquisition scheduling list. In step S1004, specific device setting data for the selected device can be obtained. This may include default error or warning levels. In step S1005, the threshold settings for error level or warning level can be set.

For initial criteria check, steps S1006-S1009 provide a check or input for criteria level. After the criteria level is checked as proper, then data acquisition can begin in step S1010. Device data is obtained in step S1011. From the data, diagnostic calculations can be done in S1012, and the data and calculations can be displayed in step S1013. In steps S1014 and S1015, the diagnosis and detection of anomalies can be done, and the results displayed.

Diagnostics Calculation

From the diagnostic data, the current value, or the current difference PV, is calculated by the "4-20 analog value" minus the "digital value (HART Command3; Primary Variable Loop Current)." The current value results are refreshed by each sampling period.

The average value for the difference PV is calculated by adding the latest sample period data and is refreshed when the sample number is a specified quantity. Table 10 illustrates exemplary information regarding the current difference PV and the average difference PV. The current difference PV and the average difference PV may have default setting values and may operate with in a set of valid range.

TABLE 10

Descriptions of Current and Average Diff. PV

| Diag. data | Parameter | Default | Valid Range | Unit | Description |
|---|---|---|---|---|---|
| Current value | Current Diff. PV | 0.0 | −20.000 −20.000 | mA | Equation 1: Current = Analog PV − Digital PV Notes: 4-20 mA minuses Digital (No absolute value to check the rend of data. If it goes to fail mode and stop the operation, the last data before stopping should be stored in this tool.) |
| Average value | Average Diff. PV | 0.0 | −20.000 −20.000 | mA | Equation 2: $$\bar{x} = \frac{1}{n}\sum_{i=1}^{n} x_i = \frac{1}{n}(x_1 + \cdots + x_n)$$ Where: x is Current Diff. PV n is Sampling count |

Diagnostics Calculations (Background Data)

Table 11 illustrates diagnostics calculations that can also be performed and stored by the AODT, based on the data acquisitions points. These are computed and can be stored for review as historical data in a memory storage unit. These calculations or values, such as the standard deviation, PV maximum, and PV minimum, may be reviewed by a user or plotted on for graphical representation.

TABLE 11

| | | | Valid | | |
|---|---|---|---|---|---|
| Diag. data | Parameter | Default | Range | Unit | Description |
| 4-20 mA Average | Analog PV Average | 0.000 | — | mA | This is the average Analog PV of all the data acquisition points. |

Equation 3:

$$\bar{x} = \frac{1}{n}\sum_{i=1}^{n} x_i = \frac{1}{n}(x_1 + \cdots + x_n)$$

Where:
x is Analog PV value
n is the total number of acquisition points of Analog PV.

| | | | | | |
|---|---|---|---|---|---|
| 4-20 mA STD Dev | Analog PV STD dev | 0.000 | — | mA | This is the standard deviation of Analog PV of all the data acquisition points. |

Equation 4:

$$\sigma = \sqrt{\frac{1}{N}\sum_{i=1}^{N}(x_i - \mu)^2} \text{, where } \mu = \frac{1}{N}\sum_{i=1}^{N} x_i.$$

Where:
x is Analog PV value
μ is the Analog Average
N is total number of acquisition points of Analog PV.

| | | | | | |
|---|---|---|---|---|---|
| 4-20 mA Max | Analog PV Max | 0.000 | — | mA | This is the maximum or the highest Analog PV from all the data acquisition points. |
| 4-20 mA Min | Analog PV Min | 0.000 | — | mA | This is the minimum or the lowest Analog PV from all the data acquisition points. |
| Digital Average | Digital PV Average | 0.000 | — | mA | This is the average Digital PV of all the data acquisition points. |

Equation 5:

$$\bar{x} = \frac{1}{n}\sum_{i=1}^{n} x_i = \frac{1}{n}(x_1 + \cdots + x_n)$$

Where:
x is Digital PV value
n is total number of acquisition points of Digital PV.

| | | | | | |
|---|---|---|---|---|---|
| Digital STD Dev | Digital PV STD dev | 0.000 | — | mA | This is the standard deviation of Digital PV of all the data acquisition points. |

Equation 6:

$$\sigma = \sqrt{\frac{1}{N}\sum_{i=1}^{N}(x_i - \mu)^2} \text{, where } \mu = \frac{1}{N}\sum_{i=1}^{N} x_i.$$

Where:
x is Digital PV value
μ is the Digital Average
N is total number of acquisition points of Digital PV.

| | | | | | |
|---|---|---|---|---|---|
| Digital Max | Digital PV Max | 0.000 | — | mA | This is the maximum or the highest Digital PV from all the data acquisition points. |
| Digital Min | Digital PV Min | 0.000 | — | mA | This is the minimum or the lowest Digital PV from all the data acquisition points. |

Diagnostics Criteria for First Time Diagnosis

As an initial set up for first time diagnosis, there is a baseline threshold set for the error level and the warning level settings. The baseline for a first time diagnosis can be set on the basis of the span ratio and upper and lower range limits.

With the rate of spans and Upper Range Limit/Lower Range Limit (URL/LRL), the criteria for the error level and the warning level will be determined automatically. Beyond this, a user can still adjust the error and the warning level.

The error level and the warning level for this first method can be determined based on:

$$\text{Error Level} = \text{Max}(\text{Error Level Default} * \text{SQRT}(\text{Span Ratio}), 1.6) \quad \text{Equation 7}$$

$$\text{Warning Level} = \text{Max}(\text{Warning Level Default} * \text{SQRT}(\text{Span Ratio}), 1.6) \quad \text{Equation 8}$$

Where:

Span Ratio=Transducer Limit Span/PV Range Span

Transducer Limit Span=Upper Transducer Limit−Lower Transducer Limit

PV Range Span=PV Upper Range−PV Lower Range

Diagnostics Criteria for Continuous Operating Process

In the scenario where enough data sampling has occurred such that an average difference PV value has been obtained, the threshold criteria can be automatically set. The threshold criteria are calculated automatically with average value of past diagnostics data.

$$\text{Warning Level} = \text{Average Diff. PV average} * n \quad \text{Equation 9}$$

$$\text{Error Level} = \text{Average Diff. PV average} * m \quad \text{Equation 10}$$

Where:

m and n are coefficient values. The coefficient values may be defined by the evaluation result of the diagnostic calculations or generally set.

In some embodiments, the system will issue a prompt to the user to reconfirm the current threshold criteria value when diagnostics data is between 1/m and 1/n of current the Warning Level.

Figure 11:
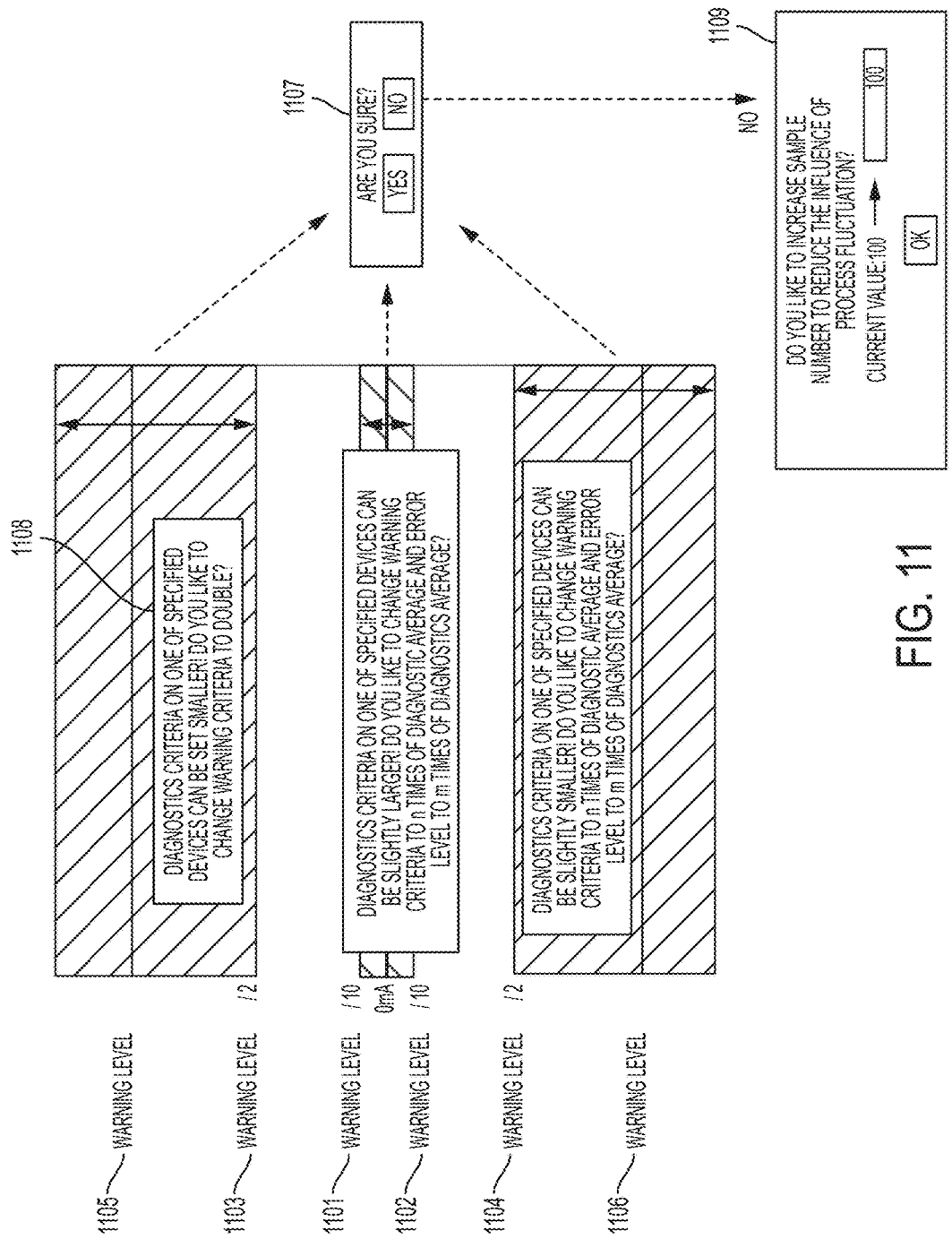
FIG. 11 illustrates an exemplary embodiment of a graphical user interface that may be used for allowing a user to configure the warning level and error level.

FIG. 11 illustrates a graphic user interface that may be used for allowing a user to configure the warning level and error level. In such a user interface, the user may be provided with a background graph of the current warning level and error level with shaded areas to highlight the different regions. The user interface may also include text notations of various options for warning levels in graphical form (1101-1106). The user interface may provide a prompt for selection of the n and m numbers for application to setting the warning level and error level (1108). To ensure safety from improper acts, a secondary confirmation prompt (1107) may appear. Also, a prompt may appear asking for changing the sample number (1109). This user interface may automatically appear when the average value of the diagnostic data is in the warning level region or error level region.

Figure 12:
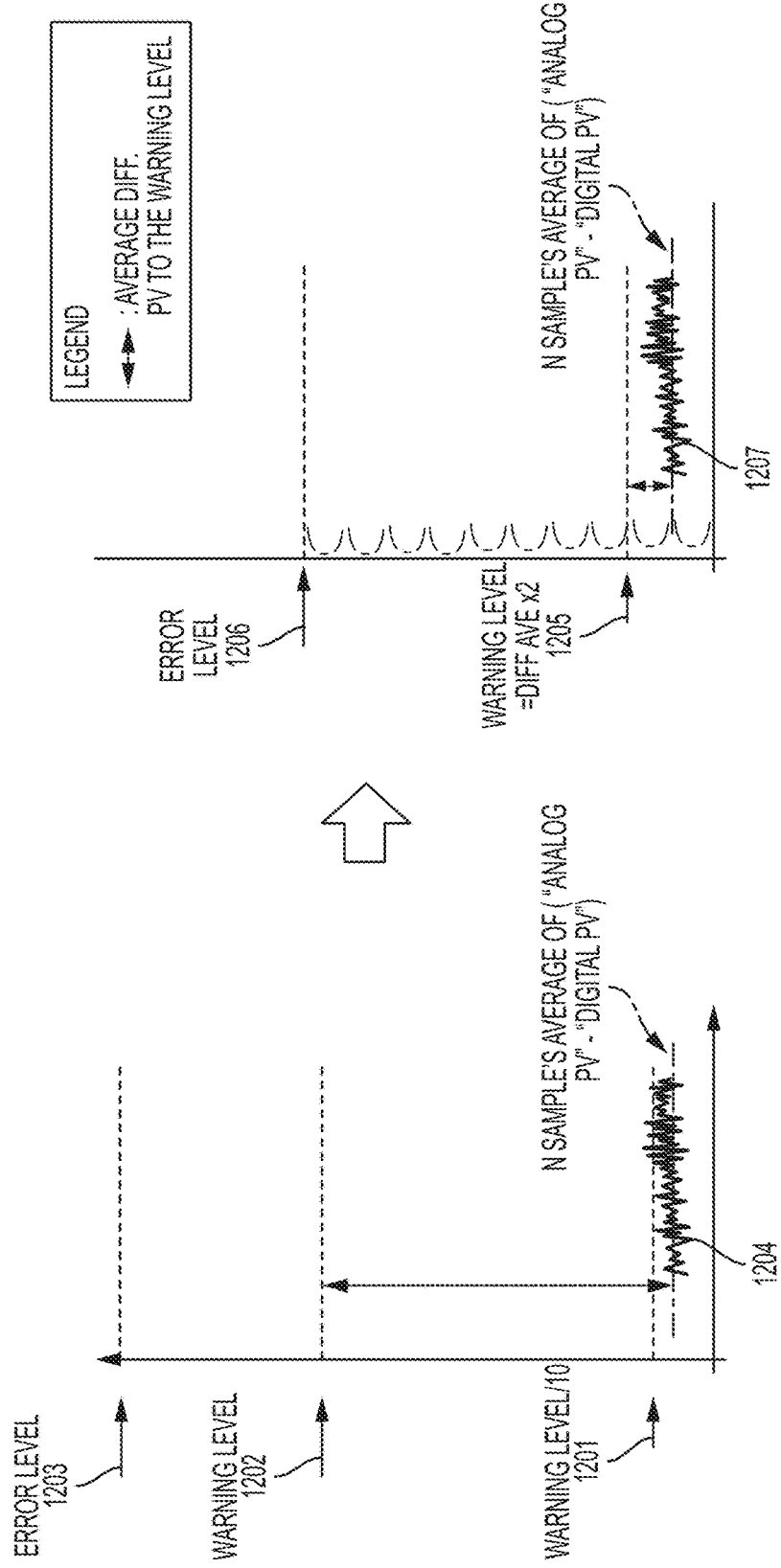
FIG. 12 illustrates scenarios of warning and error levels with respect to fluctuations in sampling data.
Figure 13:
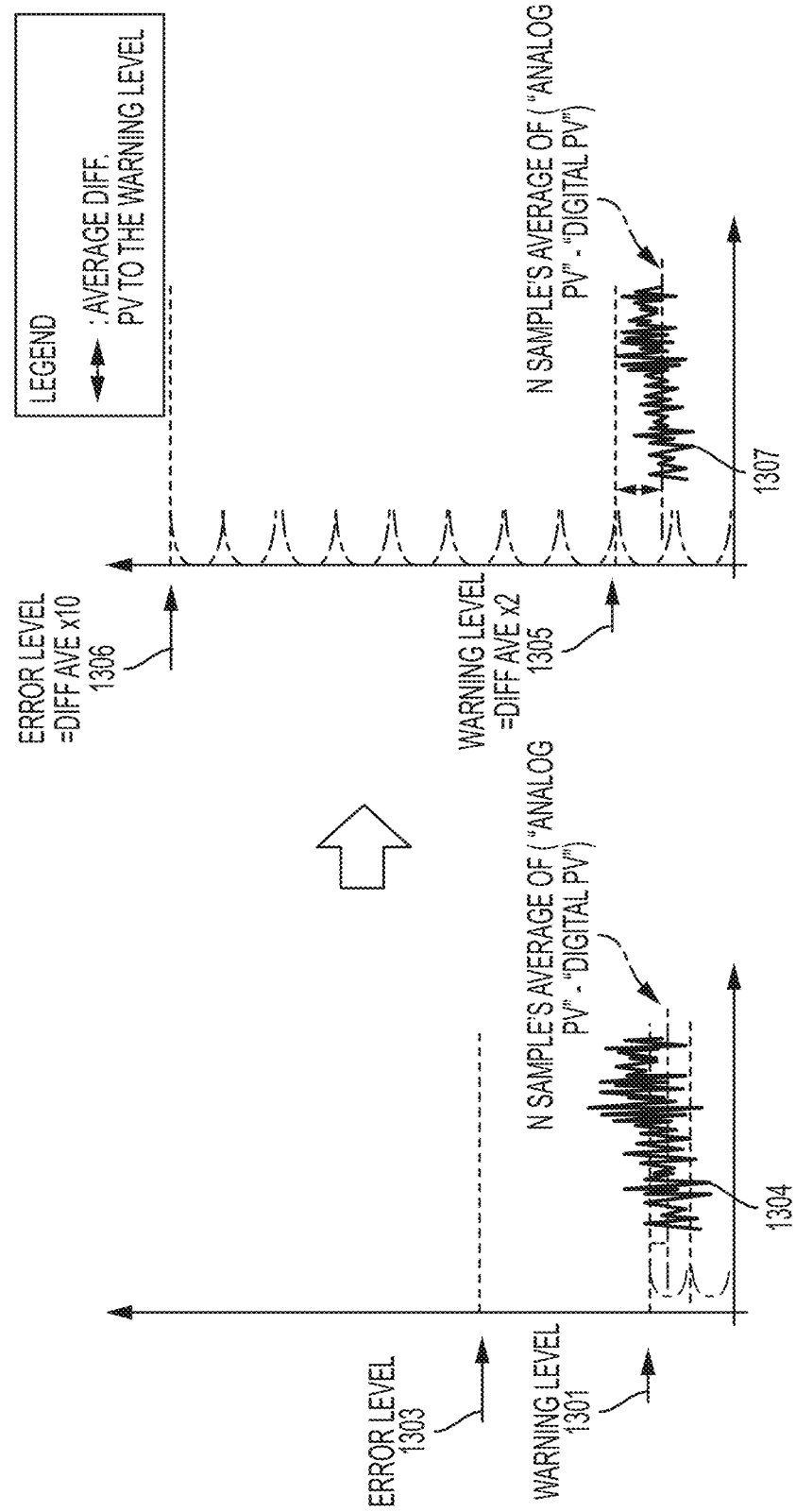
FIG. 13 illustrates scenarios of warning and error levels with respect to fluctuations in sampling data.

FIGS. 12 and 13 provide graphical examples of scenarios where tuning or changing the warning level and error level may help improve efficiency for monitoring a process. In FIG. 12, which shows a small fluctuation (1204) but a high warning level (1202, 1205) and a high error level (1203, 1206), the concern may be that default settings that are too high for the warning and error levels will result in the field device never triggering a failure diagnosis. However, too low of a warning level (1201) is also a problem, so careful selection must be made. Conversely, in FIG. 13, a process that has a large fluctuation (1304) but low warning (1301, 1305) and error levels (1303, 1306) may also be inefficient as the warning may be triggered often while the device is still acceptable for use.

Figure 14:
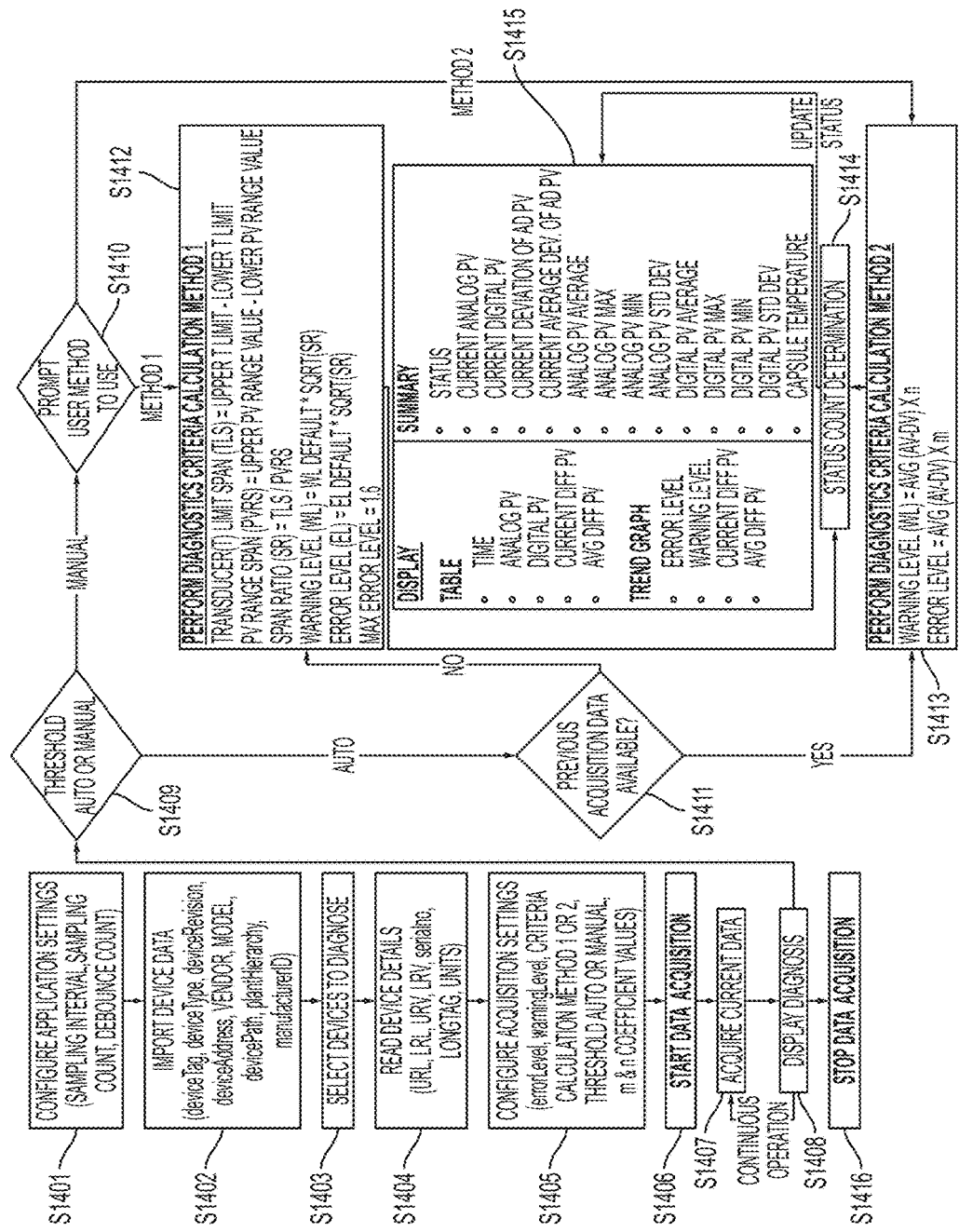
FIG. 14 illustrates a flowchart for an exemplary method or process for diagnostic data sampling and data calculation to evaluate a field device.

FIG. 14 illustrates an exemplary method or process for diagnostic data sampling and data calculation to evaluate a field device. In step S1401, basic settings to begin diagnostics can be set. These settings include the parameters for data sampling, such as sampling period, sampling number, and judgment times. In step S1402, information from the field device can be imported. In step S1403, a selection of the desired devices for data sampling can be made. This can be a data acquisition scheduling list. In step S1404, specific device setting data for the selected device can be obtained. This may include default error or warning levels. In step S1405, the threshold settings for error level or warning level can be set. From there, the start of data acquisition can be begin in step S1406 through acquiring current data in S1407 and diagnostics through S1408.

In step S1409, the threshold may be set either manually or automatically. Depending on manual or automatic mode, the process proceeds to either step S1410 or S1411. In manual mode, a user is prompted to select proceeding with either method 1 or method 2 in steps S1412 and S1413. In automatic mode, in step S1411, the determination of method 1 or method 2 is made based on the availability of previously acquired data availability. If there is no available previous data, then method 1, S1412, is selected. If there is available previous data, then method 2, S1413 is selected. From either method 1 or method 2 S1412, S1413, the status count determination in S1414 leads to the display and summation of the data samples, S1415. Upon successful diagnosis for a predetermined time period, the data acquisition can be stopped in step S1416.

Anomaly Diagnostics using Accumulated Judgment

Through the diagnostic calculation methods, the system can compare the average difference PV value to the threshold criteria for the warning level or the error level.

With the anomaly diagnostics, there may be at least two different ways for evaluation of the operational status of a field device, Accumulated Judgment and Continuous Judgment.

With Accumulated Judgment, the system evaluates the operational state by counting each sequential Okay and No Good (NG) result. Each NG result incrementally increases a count for failure. Upon hitting a threshold count number, or judgment number or de-bounce count, the system would give a Fail (F) judgment. Chart 1 of FIG. 15 illustrates this, where sample #8 results in the third NG result and a Fail judgment. The Fail judgment is then maintained until a sufficient number of Okay results incrementally decrease the count number back to zero (0).

In the Judge row of Chart 1 of FIG. 15, which describes the status of the device, N stands for Normal and F stands for Fail. Normal is where the device is in a nominal or acceptable operating state.

This results in a maintained state of Fail judgment until at least the threshold count number of sequential samples of the field device showing operation within a normal range.

Table 12 illustrates a potential default count scenario for warning and error notifications. Although a system may have a default trigger for a warning or error notification at anything more than zero (0), the system may also be set to any value of a threshold count number, such as 3 in Chart 1 of FIG. 15.

TABLE 12

Description of Warning and Error count

| Diag. data | Parameter | Default | Valid Range | Unit | Description |
|---|---|---|---|---|---|
| Warning Occurrence # | Warning Count | 0 | 0-De-bounce times | Count | Limited to De-bounce Count |
| Error Occurrence # | Error Count | 0 | 0-De-bounce times | Count | Limited to De-bounce Count |

Chart 2 of FIG. 15 illustrates an embodiment with an error level and a warning level with a threshold count of 3. As shown in sample #7, the third warning count surpassing the threshold count number triggers a warning judgment. Similarly, in sample #10, the third error count surpassing the threshold count number triggers an error judgment. The error judgment is then maintained until sample #15 with the third instance of a warning level result bringing the error count number back to zero.

With an Accumulated Judgment system, the count for resetting the operating status to a lower level of error is decremented gradually. Therefore, even if the current operating state of the field device is acceptable, it may still be in a Fail judgment due to previous errors.

Anomaly Diagnostics using Continuous Judgment

In contrast to Accumulated Judgment is Continuous Judgment. Under Continuous Judgment, the system still evaluates the operational state by counting each sequential Okay and No Good (NG) result. Each NG result incrementally increases a count for failure. Upon hitting a threshold count number, or judgment number or de-bounce count, the system would give a Fail (F) judgment. Chart 3 of FIG. 15 illustrates this, where sample #9 results in the third NG result and a Fail judgment.

However, in contrast to Accumulated Judgment, Continuous Judgment will reset the count number to zero (0) immediately upon a subsequent Okay result. This is shown in sample #11 of Chart 3 of FIG. 15.

Similar to Table 12, Table 13 illustrates a potential default count scenario for warning and error notifications. Although a system may have a default trigger for a warning or error notification at anything more than zero (0), the system may also be set to any value of a threshold count number, such as 3 in Chart 3 of FIG. 15.

Through the use of Accumulated Judgment and Continuous Judgment, an improvement for diagnostics is provided in improving the efficiency of diagnosing potentially failing field devices. Accumulated Judgment and Continuous Judgment allow for a more detailed evaluation of No Good situations across historical trends, and prevents an occasional anomalous reading from creating unnecessary false positives for failure.

TABLE 13

Description of Warning and Error count

| Diag. data | Parameter | Default | Valid Range | Unit | Description |
|---|---|---|---|---|---|
| Warning Occurrence # | Warning Count | 0 | 0-De-bounce times | Count | Limited to De-bounce Count |
| Error Occurrence # | Error Count | 0 | 0-De-bounce times | Count | Limited to De-bounce Count |

Chart 4 of FIG. 15 illustrates an embodiment with an error level and a warning level with a threshold count of 3. As shown in sample #7, the third warning count surpassing the threshold count number triggers a warning judgment. Similarly, in sample #10, the third error count surpassing the threshold count number triggers an error judgment. The error judgment is then maintained until sample #13 with the first instance of a warning level result bringing the error count number back to zero.

The Error status continues until sample #13 where the result falls back into the warning range, the error count is reset to zero (0), and the device status is changed from Error to Warning.

Similarly at the subsequent sample #14, where the result is lower than the warning level, the warning count is reset to 0 and the device status is changed from Warning to Normal.

Alternatively, the device status could be changed directly from Error to Normal if a sample after reaching the Error state is within the Normal range. In such a situation, both the error count and the warning count would be reset to zero (0).

Diagnostic Data and Calculations

Figure 5:
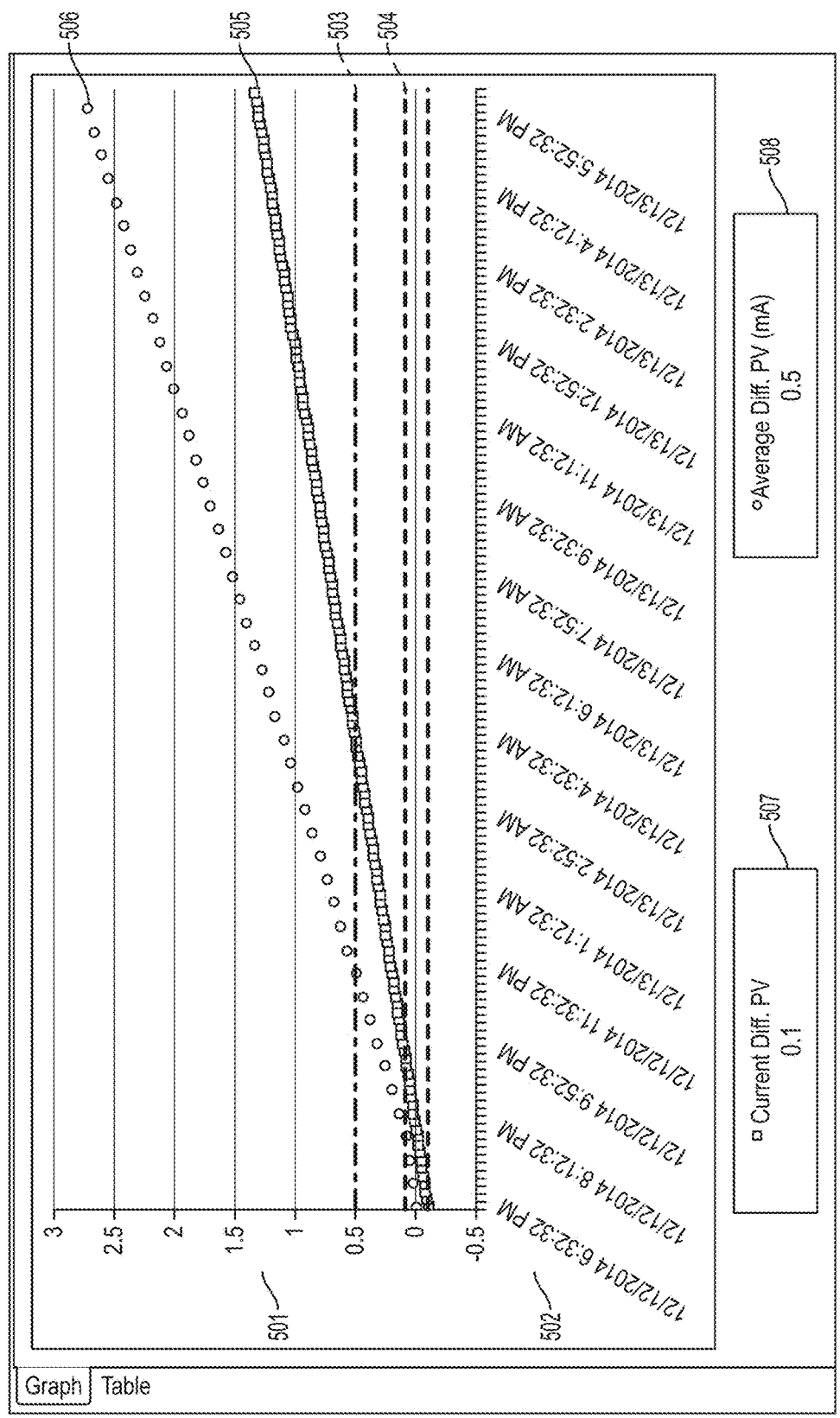
FIG. 5 illustrates a chart of current and average difference PV values as a potential output from the diagnostic tool.

FIG. 5 illustrates the ability for the AODT to graph plots of the data points that are acquired in graphical form. The elements of FIG. 5 correspond to the section descriptions of Table 14.

TABLE 14

Graph Section Description

| ID | Section | Description |
|---|---|---|
| 501 | PV | This is PV (Y-Axis). Value is in milliAmpere (mA). |
| 502 | Time | This is timestamp of the data acquisition (X-Axis). Value is in date time. |
| 503 | Error Level | The diagnostics threshold for Error Level. Positive and Negative values. Value is in milliAmpere (mA). |
| 504 | Warning Level | The diagnostics threshold for Warning Level. Positive and Negative values. Value is in milliAmpere (mA). |
| 505 | Current Diff. PV | This is difference between Analog PV minus Digital PV (A − D) plotted in the graph for each acquisition point. Value is in milliAmpere (mA). |
| 506 | Average Diff. PV | This is average of Current Diff. PV (mA) based on sampling count plotted in the graph for each average of current. Value is in milliAmpere (mA). |
| 507 | Latest Current Diff PV | This is the latest current difference between Analog PV minus Digital PV (A − D). Value is in milliAmpere (mA). |
| 508 | Latest Average Diff. PV | This is the latest Average Diff. PV (mA) based on sampling count. |

Graphically, the data can be expressed in terms of a plot where PV (501) is the Y-axis with values in milliamperes (mA) and time (502) of the data acquisition is the X-axis. The error level (503) can show a threshold for an error alert can be indicated by a horizontal line at a set PV difference. Similarly, a warning level (504) can show a threshold for a warning alert can be indicated by a horizontal line at a set PV difference. Generally a warning alert will be set to a smaller range than an error alert. The current difference in PV (505), which is the difference between the analog PV and the digital PV, and the average difference in PV (506), which is the average of the current difference in PV based on sampling count, can be plotted. Additionally, the latest current difference PV and latest average difference PV (505) can be displayed with the plot.

FIG. 6 and Table 15 illustrate an embodiment that provides the data points acquired in a tabular form. The table can include fields for time (61), analog PV (62), digital PV (63), current difference PV (64), and average difference PV (65).

TABLE 15

Table Section Description

| ID | Section | Description | Is Read Only |
|---|---|---|---|
| 61 | Time | This is timestamp of the data acquisition. | Yes |
| 62 | Analog PV | This is acquired Analog PV. Value is in milliAmpere (mA) | Yes |
| 63 | Digital PV | This is acquired Digital PV. Value is in milliAmpere (mA) | Yes |
| 64 | Current Diff. PV | This is difference between Analog PV minus Digital PV (A − D). Value is in milliAmpere (mA) | Yes |
| 65 | Average Diff. PV | This is average of Current Diff. PV based on sampling count. Value is in milliAmpere (mA) | Yes |

FIG. 7 and Table 16 show a table for Diagnostics Data Calculation and the various data points or values that can be collected, calculated, or stored. In the table, the status (701) may be indicated by different background colors in that section of the table. For example, an uncertain status may have a clear or white background; a normal status may have a green background; a warning alert may have a yellow background; and an error alert may have a red background. The table may also contain current analog PV (702), current digital PV (703), current deviation AD PV (704), current average deviation of AD PV (705), capsule temperature (706), analog PV average (707), analog PV min (708), analog PV max (709), analog PV standard deviation (710), digital PV average (711), digital PV min (712), digital PV Max (713), and digital PV standard deviation (714).

TABLE 16

Diagnostics Data Calculation Section Description

| ID | Section | Description | Is Read Only | Default Value |
|---|---|---|---|---|
| 701 | Status | Current Status of the display based on diagnostics result. The following background colors are shown based on the current diagnostics status.<br>No color — Uncertain<br>Green — Normal<br>Yellow — Warning<br>Red — Error | Yes | Uncertain |
| 702 | Current Analog PV | This is the current value of the analog PV (Process Value). Value is in milliAmpere (mA) | Yes | Blank |
| 703 | Current Digital PV | This is the current value of the Digital PV (Process Value). Value is in milliAmpere (mA) | Yes | Blank |
| 704 | Current Deviation AD PV | This is the current deviation of the analog and digital PV (Process Value). Value is in milliAmpere (mA) | Yes | Blank |
| 705 | Current Average Deviation of AD PV | This is the average of the deviation of analog and digital PV (Process Value). Value is in milliAmpere (mA) | Yes | Blank |
| 706 | Capsule Temperature | This is the value of the Capsule Temperature from the device. | Yes | Blank |
| 707 | Analog PV Average | This is the average Analog PV of all the data acquisition points. Value is in milliAmpere (mA) | Yes | Blank |
| 708 | Analog PV Min | This is the minimum or the lowest Analog PV from all the data acquisition points. Value is in milliAmpere (mA) | Yes | Blank |
| 709 | Analog PV Max | This is the maximum or the highest Analog PV from all the data acquisition points. Value is in milliAmpere (mA) | Yes | Blank |
| 710 | Analog PV Standard Deviation | This is the standard deviation of Analog PV of all the data acquisition points. | Yes | Blank |
| 711 | Digital PV Average | This is the average Digital PV of all the data acquisition points. Value is in milliAmpere (mA) | Yes | Blank |
| 712 | Digital PV Min | This is the minimum or the lowest Digital PV from all the data acquisition points. Value is in milliAmpere (mA) | Yes | Blank |
| 713 | Digital PV Max | This is the maximum or the highest Digital PV from all the data acquisition points. Value is in milliAmpere (mA) | Yes | Blank |
| 714 | Digital PV Standard Dev | This is the standard deviation of Digital PV of all the data acquisition points. | Yes | Blank |

Although this specification has been described above with respect to the exemplary embodiments, it shall be appreciated that there can be a variety of permutations and modifications of the described exemplary features by those who are ordinarily skilled in the art without departing from the technical ideas and scope of the features, which shall be defined by the appended claims.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

Although the drawings describe the UI views in a specific order or layout, one should not interpret that the UI views are performed in a specific order or layout as shown in the drawings or successively performed in a continuous order, or that all the UI views are necessary to obtain a desired result. Also, it should be noted that all embodiments do not require the distinction of various system components made in this description. The device components and systems may be generally implemented as a single software product or multiple software product packages.

A number of examples have been described above. Nevertheless, it is noted that various modifications may be made. For example, suitable results may be achieved if the described techniques are performed in a different order and/or if components in a described system, architecture, or device are combined in a different manner and/or replaced or supplemented by other components or their equivalents. Accordingly, other implementations are within the scope of the following claims.

There is claimed:

1. A method comprising:
   acquiring an analog process variable (PV) value of a process of a first field device in an industrial process, from the first field device;
   acquiring a digital process variable (PV) value of the process from the first field device, the digital PV value corresponding to the analog PV value;
   calculating a difference value between the analog PV value and the digital PV value;
   comparing the difference value to a first threshold alert value; and
   in response to the difference value exceeding the first threshold alert value, issuing an alert and automatically diverting a flow path of the industrial process through a second field device that is different from the first field device;
   wherein the analog PV value and the digital PV value are iteratively reacquired at a scheduled interval from the first field device, wherein the difference value is iteratively recalculated for the scheduled intervals, and wherein the alert is only issued after a set number of successive iterations where the difference value exceeds the first threshold alert value.

2. The method according to claim 1, further comprising:
   counting a number of alerts,
   wherein the number of alerts count increases for successive iterations where the difference value exceeds the first threshold alert value.

3. The method according to claim 2, wherein the number of alerts count resets to zero after the difference value falls below the first threshold alert value.

4. The method according to claim 2, wherein the number of alerts count incrementally increases or decreases based on comparing the difference value to the first threshold alert value.

5. A system comprising:
   at least one memory configured to store computer program code; and
   at least one processor configured to access the at least one memory and operate according to the computer program code, the computer program code comprising:
   first acquiring code configured to cause at least one of the at least one processor to acquire an analog process variable (PV) value of a process of a first field device in an industrial process, from the first field device;
   second acquiring code configured to cause at least one of the at least one processor to acquire a digital process variable (PV) value of the process from the first field device, the digital PV value corresponding to the analog PV value;
   calculating code configured to cause the at least one of the at least one processor to calculate a difference value between the analog PV value and the digital PV value;
   comparing code configured to cause the at least one of the at least one processor to compare the difference value to a first threshold alert value; and
   abnormality code configured to cause the at least one of the at least one processor to, in response to the difference value exceeding the first threshold alert value, issue an alert and automatically divert a flow path of the industrial process through a second field device that is different from the first field device;
   wherein the analog PV value and the digital PV value are iteratively reacquired at a scheduled interval from the first field device, wherein the difference value is iteratively recalculated for the scheduled intervals, and wherein the alert is only issued after a set number of successive iterations where the difference value exceeds the first threshold alert value.

6. The system according to claim 5, the program code further comprising:
   counting a number of alerts,
   wherein the number of alerts count increases for successive iterations where the difference value exceeds the first threshold alert value.

7. The system according to claim 6, wherein the number of alerts count resets to zero after the difference value falls below the first threshold alert value.

8. The system according to claim 6, wherein the number of alerts count incrementally increases or decreases based on comparing the difference value to the first threshold alert value.

9. The method according to claim 1, wherein the digital PV value is acquired from the first field device separately from the analog PV value.

10. The system according to claim 5, wherein the digital PV value is acquired from the first field device separately from the analog PV value.

11. A method comprising:
    selecting, from among a plurality of field devices in an industrial process, a diagnostic set comprising a plurality of selected field devices;

acquiring, from each of the field devices in the diagnostic set, an analog process variable (PV) value of a process of the field device, from the field device;

acquiring, from each of the field devices in the diagnostic set, a digital process variable (PV) value of the process from the field device, the digital PV value corresponding to the analog PV value for the field device;

determining, for each of the field devices in the diagnostic set, whether there is an analog-digital mismatch for the field device based on the analog PV value and the digital PV value of the field device; and in response to determining there is an analog-digital mismatch, issuing an alert and automatically diverting a flow path of the industrial process through another field device of the plurality of field devices in the industrial process;

wherein determining whether there is an analog-digital mismatch for the field device comprise: calculating difference value between the analog PV value and the digital PV value of the field device; comparing the difference value to a first threshold alert value; and in response to the difference value being greater than or equal to the first threshold value, determining there is an analog-digital mismatch for the field device.

* * * * *